May 10, 1927.
J. P. CURLS
1,628,122
TIRE PATCHING MACHINE
Filed June 18, 1926
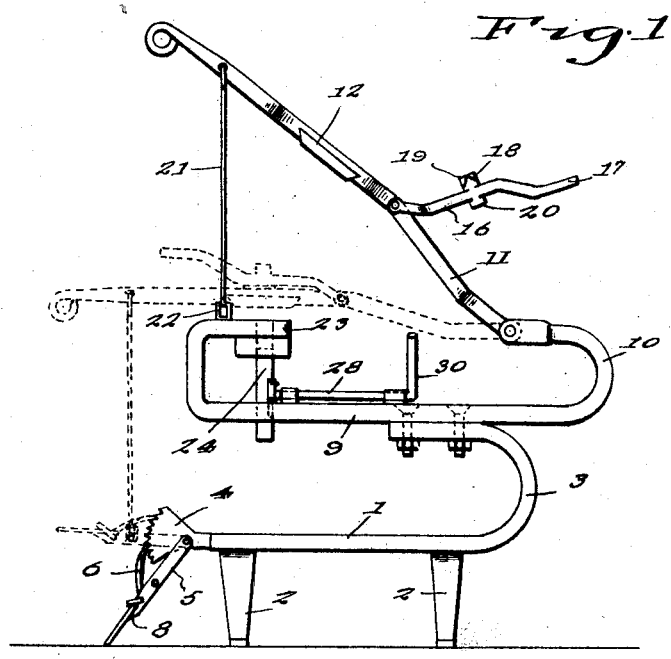
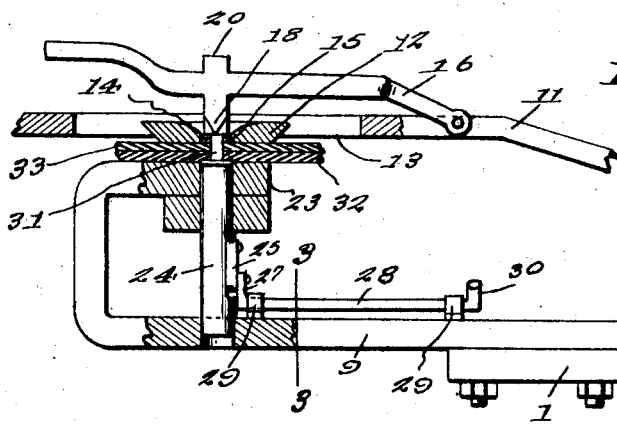
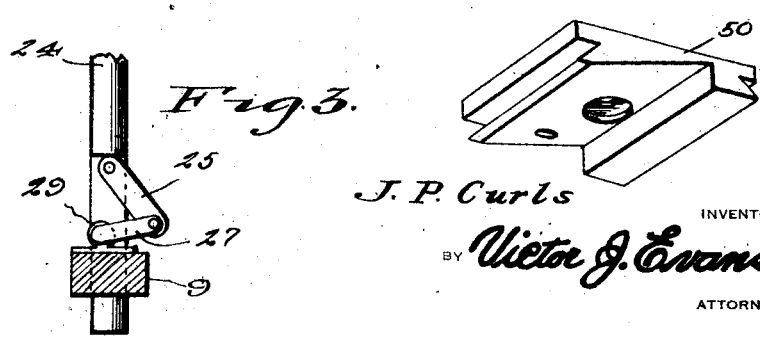
J. P. Curls
INVENTOR
WITNESS:
ATTORNEY Patented May 10, 1927.

1,628,122

UNITED STATES PATENT OFFICE.

JULIUS P. CURLS, OF COFFEYVILLE, KANSAS.

TIRE-PATCHING MACHINE.

Application filed June 18, 1926. Serial No. 116,937.

My present invention has reference to a machine for applying patches to tire casings.

From experience I have found that holes snagged in tire casings cannot be properly vulcanized, but that such holes can be covered by a patch which is riveted on the casing, and that the cost for thus repairing a tire is comparatively small and, therefore, it may be considered the primary object of this invention to produce a machine of a comparatively simple construction which may be easily operated for effectively riveting a patch on a tire or for applying a plug in a hole made in a tire.

With the above broadly stated object in view, and many others which will appear as the nature of the invention is better understood, the improvement resides in the construction, combination and operative association of parts, a satisfactory embodiment of which is illustrated by the drawings which accompany and form part of this application.

In the drawings:

Figure 1 is a side elevation of my improvement.

Figure 2 is a fragmentary side elevation with parts in section, showing the rivet about to be applied.

Figure 3 is a detail sectional view approximately on line 3—3 of Figure 2.

Figure 4 is a second form of plate which may be removably secured to the lever.

The base 1 of my improvement is supported on legs 2. The base is in the nature of a flat metal member that has one of its ends upwardly rounded, as at 3. The straight end of the base 1 has extending therefrom a segmental rack 4 to which is pivoted a lever 5. The lever has pivotally secured thereon a dog 6 to engage the teeth of the rack 4, and the said dog, adjacent to its pivot, has on one of its sides a hook 7. The hand lever of the dog is for distinction indicated by the numeral 8.

Secured to the straight inwardly directed portion of the upwardly rounded end 3 of the base there is a metal plate in the nature of a table 9. The table has its end, which extends beyond the rounded end 3 of the base, also rounded upwardly, as at 10, the inwardly directed end of the said rounded portion 10 being bifurcated and having pivoted in the said bifurcation an arm 11. The arm 11 is offset from its pivoted end, but is formed with a straight extension in which there is set a magnetized plate 12. The plate 12 is preferably dove-tailed in the arm 11, and the said arm, at the portion thereof receiving the plate therethrough, is slotted, as at 13, and the plate 12 having its upper face depressed to the center thereof, and the under flat face of the said plate being formed with a rounded depression 14. This depression is designed to have seated therein a rivet 15, the rivet being held by magnetism on the plate 12.

Pivotally secured to the arm 11 there is a lever 16. The lever has its outer end offset to provide a handle portion 17. The lever, on what I will term its inner face, is formed with a head 18 provided with right-angularly extending cutting surfaces 19 and opposite the head 18 the lever is provided with a boss 20. Loosely supported on the outer end of the lever 11 there is a rod 21 having its outer end formed with an eye 22.

The table has its second end extended upwardly and from thence inwardly to provide a bed 23 on which the work rests. The bed 23 and the table have aligning openings for the reception of a punch 24. The punch has one of its sides notched and in this notch there is pivoted a link 25. To the link there is pivoted the angle or offset end 27 of a lever 28. The lever is journaled in suitable bearings 29 on the table 9 and has its outer end offset to provide a handle portion 30. The punch is of magnetized metal so that the same will attract and hold thereon a rivet 31. By swinging the lever 28 the punch is moved upwardly through the casing 32 and the patch 33 to be riveted on the tire casing. Of course, the patch rests on the bed 23 and the particular and peculiar construction of the frame permits the arrangement of any part of the casing on the bed. Before the lever and punch is thus moved, however, the arm 11 is swung downwardly and the eye end of the rod 21 is brought to engage with the hook 7 on the dog. The dog, together with the lever 5 is swung so that the active end of the dog will engage a desired tooth of the segment 4 to hold the arm 11 in proper position with respect to the tire casing and the patch 33. The lever 16 is then swung over the arm so that its cutting head 18 will be brought opposite the end of the rivet 31 which is projected through the casing 32 and the patch 33. Either a pressure is exerted upon the lever or the boss or enlargement 20 thereof is subjected to the blow of a hammer which causes the cutting surfaces 19 of the head 18 to split the rivet and spread the same over the washer 14, thereby effectively clinching the rivet against the washer and securing the patch on the tire casing.

The improvement is, of course, also designed to repair rim cuts, in which instance, a plate 50 such as disclosed by Figure 4 of the drawings, is substituted in lieu of the plate 12 and the patch is riveted on to the bead of the tire. Preferably the plate 50 is also of magnetized metal. Obviously a patch may be placed on the inside as well as on the outside of the tire, and if an especially prepared patch is employed the casing will rest on the bed.

The simplicity and the advantages of my improvement will be perfectly apparent to those skilled in the art to which such invention relates when the foregoing has been carefully read in connection with the accompanying drawings, it being, of course, understood that I do not wish to be limited to the precise details of construction herein set forth and hold myself entitled to such changes therefrom as fairly fall within the scope of what I claim.

Having described the invention, I claim:—

In a device for the purpose set forth, a leg supported base having one of its ends rounded, a table on said end, said table having an upset end merging into an inwardly directed part which provides a bed, the second end of the table being rounded upwardly and inwardly, an arm pivotally secured to the last mentioned end of the table, said arm having an opening therethrough designed to be arranged over the bed when the arm is swung thereagainst, a washer, a supporting member carried by the lever and arranged transversely with respect to the opening therethrough and having its upper face depressed and its under face grooved around said depression and said grooves designed to receive a washer therein, a lever pivotally secured to the arm, a head on the lever having rightangle cutting surfaces, a boss on the lever opposite the head, a plunger movable through the table and the bed and designed to have seated thereon a rivet, said bed adapted to provide a rest for a tire casing and a patch to be riveted thereto, means for moving the plunger to force rivet through the casing and through the patch, after the arm has been swung to hold the patch and casing on the bed, an eye carrying rod swingably supported on the arm, a segmental rack on one end of the base, a lever pivotally secured on the rack, a swingable dog carried by the lever, a hook on the dog to engage with the eye of the rod, and said first mentioned lever designed to be swung on the arm to bring its head against the projecting end of the rivet to spread said end of the washer, as and for the purpose set forth.

In testimony whereof I affix my signature.

JULIUS P. CURLS.